United States Patent
Bar (10) Patent No.: US 7,647,309 B1
(45) Date of Patent: Jan. 12, 2010

(54) BROWSE RELEVANCE

(75) Inventor: Tamar Bar, Los Altos, CA (US)

(73) Assignee: A9.com, Inc., Palo Alto, CA (US)

( * ) Notice: Subject to any disclaimer, the term of this patent is extended or adjusted under 35 U.S.C. 154(b) by 286 days.

(21) Appl. No.: 11/693,626

(22) Filed: Mar. 29, 2007

(51) Int. Cl.
   G06F 17/30 (2006.01)
   G06F 7/00 (2006.01)
(52) U.S. Cl. ............ 707/3; 705/26; 707/7; 707/10
(58) Field of Classification Search ............ None
   See application file for complete search history.

(56) References Cited

U.S. PATENT DOCUMENTS

| | | | |
|---|---|---|---|
| 6,785,671 B1* | 8/2004 | Bailey et al. ............ | 707/3 |
| 7,058,599 B2* | 6/2006 | Hanks et al. ............ | 705/27 |
| 2001/0044748 A1* | 11/2001 | Maier ............ | 705/26 |
| 2006/0059144 A1* | 3/2006 | Canright et al. ............ | 707/5 |
| 2006/0212362 A1* | 9/2006 | Donsbach et al. ............ | 705/26 |

* cited by examiner

Primary Examiner—Greta L Robinson
Assistant Examiner—James J Wilcox
(74) Attorney, Agent, or Firm—Townsend and Townsend Crew LLP (57) ABSTRACT

Methods and systems for configuring the display of items in a network-based merchandising environment are provided. In one embodiment, the present invention identifies items within a catalog of items, computes a browse relevance score for each item, and configures the display of a Web page such that items with the highest browse relevance score are prominently displayed. In at least one embodiment, browse data, such as category fit data, popularity data, newness data, etc., are used to compute the browse relevance score for each item.

44 Claims, 8 Drawing Sheets

BROWSE RELEVANCE

BACKGROUND

With the expanding use of computer networks, such as the Internet, an increasing amount of commerce is conducted electronically. Retailers, manufacturers, and others have made virtually every type of product and service available to consumers via computer networks. The advantages of purchasing products and services electronically from retailers are numerous. For example, consumers are presented with a wide selection of products to choose from and have the convenience of shopping for products from anywhere a consumer may have access to a computer network, rather than making a trip to a typical department store.

However, electronic retailers face unique challenges that are not present in a typical department store. Given the large amount of goods and services (collectively and interchangeably referred to herein as "items") being offered for sale, effective display of items is crucial for online retailers. Electronic retailers can find it difficult to ensure that high selling items attract the attention of customers. In addition, electronic retailers can find it difficult to ensure that new products and services are not effectively lost amongst the large number of pre-existing items being offered for sale. The present invention is directed to a computer-implemented method and system that give electronic retailers the ability to ensure that items for sale attract the attention of customers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with embodiments of the invention, a system and methods are provided for configuring the display of items stored in an electronic catalog for possible purchase such that particular items are prominently displayed. For example, a method is disclosed that includes identifying a plurality of items that are classified into one or more categories. Each category is associated with a browse node that is part of a hierarchical structure of several browse nodes. As users browse Web pages representing browse nodes that correspond to categories, the method gathers a variety of data regarding the users' activities. The collected data regarding the user's activity may be used to generate browse relevance scores for items that are available for purchase. The browse relevance scores are used determine the display configuration of items within a network-based merchandising environment such that items with higher browse relevance scores are prominently displayed.

In accordance with another aspect of the invention a display configuration for a Web page is generated. Items are identified for which the display will be configured and browse relevance data is obtained for each of those items. Using the browse relevance data, a browse relevance score for each item is determined and items having the highest browse relevance scores are identified. Utilizing the browse relevance scores, a display configuration is generated such that items with the highest browse relevance scores are prominently displayed.

In accordance with another aspect of the present invention, a computer readable medium having computer-executable components for determining relevance of items with respect to a category is provided. The computer readable medium includes a category fit component that is configured to determine categories in which items should be categorized. A browse score component configured to determine historical activities of users with respect to the items and a popularity score component configured to determine the popularity of an item may also be included. Additionally, a browse relevance score component configured to determine browse relevance scores for each item associated with the category is also provided. The browse relevance score component determines the browse relevance scores based on information obtained from the category fit score component, browse score component, and the popularity score component.

In accordance with another aspect, a method for determining browse relevance scores for an item categorized into multiple categories is provided. The method identifies each category with which the item is associated and determines a variety of scores for each category. For example, a category fit score may be determined for each category based on how well the item fits within the category. A browse score may be determined based on the historical activities of users within a browse node that corresponds to the item's category. A popularity score may determined based on the popularity of the item. Based on the variety of scores that are determined, a browse relevance score may be determined for each category.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present invention relate to a method and system for using browse relevance data to determine the display of an item within browse nodes for all the categories to which the item is associated. The following detailed description describes illustrative embodiments of the invention. Although specific system configurations and flow diagrams are illustrated, it should be understood that they are presented for purposes of example only and should not be construed as limiting.

In a typical network-based merchandising environment, a user can search for items (goods and/or services) within a category or group of items in an electronic item catalog. A catalog of items (including each item's description) may be organized into a browse tree structure in order to facilitate searching. As the name suggests, a "browse" tree permits users to "browse" through various items, which are logically arranged in the form of a hierarchical tree. Items are located within the browse tree based on their category. Each node of the browse tree (a.k.a., a "browse node") may be associated with a category of items in a hierarchical manner. Moreover, the browse tree may be displayed via a user interface as a collection of hyperlinks, each hyperlink corresponding and providing further access to a browse node of the tree. Thus, the browse tree structure contains a number of browse nodes representing different categories of items found within a catalog of items. For example, the "root" node of a tree representing "all items" has many browse nodes corresponding to categories such as "Books," "Electronics," "Kitchen & Housewares," etc. Each such browse node may have different child browse nodes representing sub-categories. For example, a parent browse node such as "Kitchen & Housewares" may have a number of child browse nodes such as "Dining," "Cookware," etc. Accordingly, to find an item within the "Kitchen & Housewares" category, a user may select a hyperlink associated with the child browse node "Dining." Selecting "Dining" will display a list of further child browse nodes representing sub-categories including "Drinkware." In turn, selecting "Drinkware" will display a list of further child browse nodes representing sub-categories of "Drinkware" including "Coffee Mugs." Finally, selecting "Coffee Mugs" will display a list of actual Dining products ("leaves"), which are available for purchase and are all related to "Coffee Mugs." In this manner, a user can search through a browse tree and locate specific items of interest.

Further, each category of items and its corresponding browse nodes within the browse tree occupies a level. Using the example above, the root node of the tree representing "all items" would occupy the top level and each subcategory occupies its own level. For instance, categories such as "Books," "Electronics," "Kitchen & Housewares," etc., may occupy a second level of the browse tree. Subcategories of "Kitchen & Housewares" such as "Dining," "Cookware," etc., may occupy a third level of the browse tree and so on. It will be appreciated by one who is skilled in the art that an arrangement of browse nodes can span any number of levels.

In a typical retail department store, a store owner has the ability to place items in particular locations, such as high traffic areas, to attract the attention of customers. A popular and fast selling item may be placed in the center of a store aisle or a product featuring a popular actor may be placed at the end of an aisle to attract the attention of potential customers. Thus, a "brick and mortar" retail store owner is able to use current trends and the buying habits of customers to determine the physical placement of items within the retail store.

Unlike a retail store owner, electronic retailers are limited as far as means of displaying items at specific physical locations. Given the potential for large volumes of products being offered for sale by an electronic retailer, new and popular products can potentially be located so deep within the browse tree structure that customers do not find them quickly or, in some instances, do not find them at all. Thus, there exists a need for a system and method that allows an electronic retailer to use the browsing habits of consumers to determine which items within the browse tree structure should be displayed to the customer. To fulfill this need, embodiments of the present invention may be utilized to determine a display configuration of items for particular browse nodes. As used herein, a display configuration is a visual arrangement of items or objects for use in generating a graphical presentation of those items or objects. In one embodiment, each item associated with a node receives a relevance score. This can be done when a node with a group of items is established, as new items are added to an existing node, and/or as events change causing items to become more or less relevant. The scores for those items may be used to determine the display configuration of items within the browse node. Accordingly, in some embodiments, items with higher relevance scores are displayed at the browse node level more prominently and/or instead of items with lower relevance scores.

The following description first provides an overview of systems in which aspects of the present invention may be implemented. Thereafter, methods that use relevance data to determine the display configuration of items associated with a browse node are described. Illustrative examples provided herein are not intended to be exhaustive or to limit the invention to the precise forms disclosed. Any steps described herein may be interchangeable with other steps, or combinations of steps, in order to achieve the same result.

Figure 1:
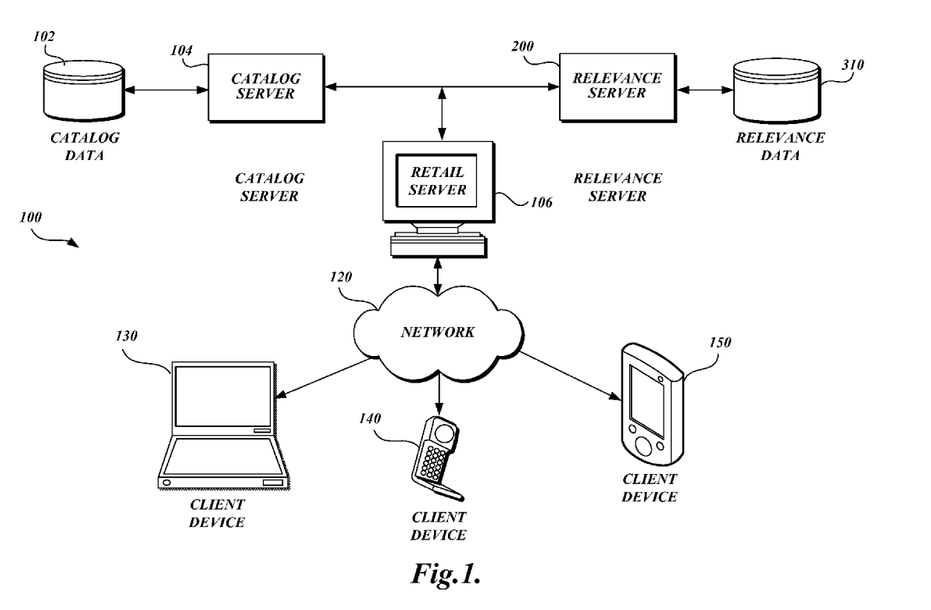
FIG. 1 is a block diagram of an illustrative computing environment formed in accordance with an aspect of the present invention including servers, a network, and a client device.

FIG. 1 provides an illustrative overview of a distributed computing environment 100 in which embodiments of the invention may be implemented. The depicted environment includes a catalog server 104 for retrieving catalog data 102 identifying items organized within one or more browse trees. In addition, those skilled in the art will recognize that if more than one browse tree is stored, the browse trees may be interconnected and/or overlapping. Accordingly, a user browsing in one tree may browse to another without interruption. The browse node attributes can be used to describe and/or identify items that fall into a certain category associated with the browse node. In addition, the attributes of a browse node are typically common to all or a substantial portion of the items that are associated with the browse node. In one embodiment, a subject-matter expert creates browse node attribute data associated with each browse node and items with matching attributes are identified and associated with the browse node. In yet other embodiments, attributes are automatically or algorithmically determined and associated with each browse node and matching items automatically identified and associated.

Figure 3:
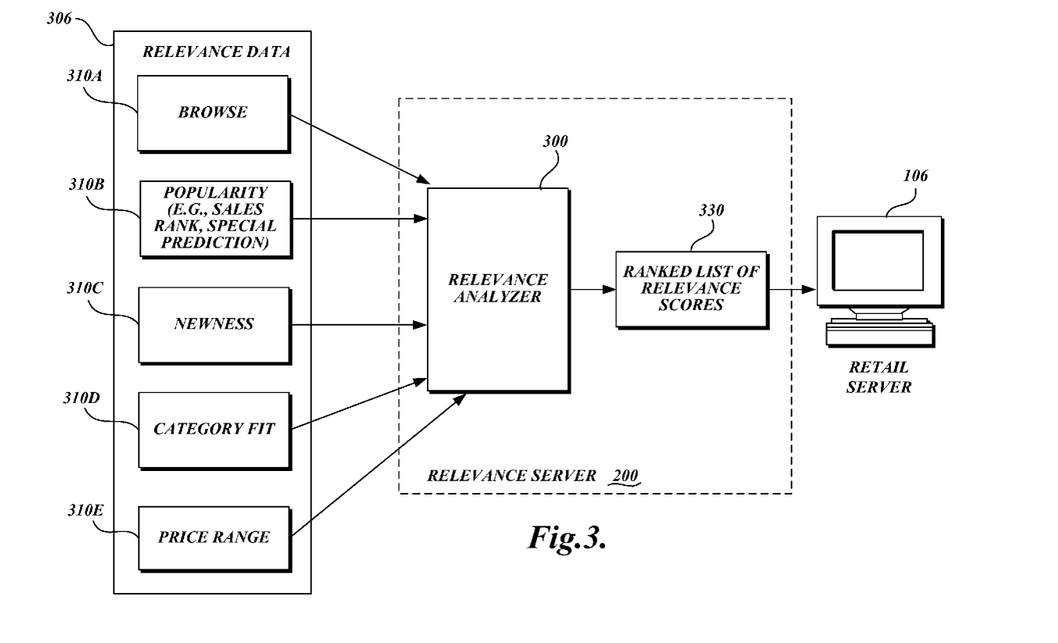
FIG. 3 is a block diagram of a relevance analyzer using relevance data to generate a ranked list of relevance scores in accordance with an embodiment of the present invention.

The catalog server 104 is communicatively connected to a relevance server 200 which receives the catalog data 102 from the catalog server 104. The relevance server 200 also receives relevance data 310. In addition, the catalog server 104 and relevance server 200 are communicatively connected to the retail server 106. Referring briefly to FIG. 3, the relevance data 310 includes, but is not limited to, a collection of browse data 310A, popularity data 310B, newness data 310C, category fit data 310D, and price range data 310E regarding an item. Browse data 310A, is related to historical browse habits of users with respect to an item. Included in the browse data 310A is clickstream data which specifies paths users have taken while browsing a Web site or other network resource in order to reach specific items. Each distinct selection made on a network document, e.g., a Web page, adds one click to the stream. The browse data also includes information regarding the nature of the selections being made while in a particular browse node. This includes, but is not limited to, the number of times the item has been selected or clicked upon, the number of times an item has been selected for purchase or placed in a "shopping cart," and the number of times the item has actually been purchased. For example, each time a user browses to and purchases a coffee mug featuring a popular television character, details of that transaction are gathered and stored as relevance data 310.

Popularity data 310B is related to the popularity of an item based on the items sales rank, user comments, etc. Newness data 310C is related to whether the item is a new or pre-existing item. Category fit data 310D is related to how strong a match exists between the item selected and the category it was selected within. Price range data 310E is related to the price of an item compared to similar items within the same category. Browse data 310A, popularity data 310B, newness data 310C, category fit data 310D, and price range data 310E will be discussed in more detail below.

The relevance server 200 uses the relevance data 310 to create a ranked list of relevance scores 330 for each item associated with a browse node. The ranked list of relevance scores 330 is then used to determine how to configure the display of items associated with a browse node. This process is described in greater detail below.

In the environment 100, retail server 106 is also communicatively connected to a network 120 which enables communication with a number of client devices 130, 140, and 150. One skilled in the art will recognize that there are a number of client devices that are capable of communicating over a network including, but not limited to set-top boxes, personal digital assistants, mobile phones, digital media players, Web pads, tablets, laptop computers, desktop computers, electronic book readers, etc. Client devices 130, 140, and 150 are shown here for purposes of example only and should not be construed as limiting. Protocols and components for providing communication between the client devices 130, 140, and 150 and the network 120 are well known to those skilled in the art of computer communications and thus, need not be described here in more detail.

In addition, the network 120 may be a Local Area Network ("LAN"), a larger network such as a Wide Area Network ("WAN"), or a collection of networks such as the Internet. Because protocols for network communication such as TCP/IP are well known to those skilled in the art of computer networks, further description of these protocols and other methods used to implement the network 120 are not provided herein.

Figure 8:
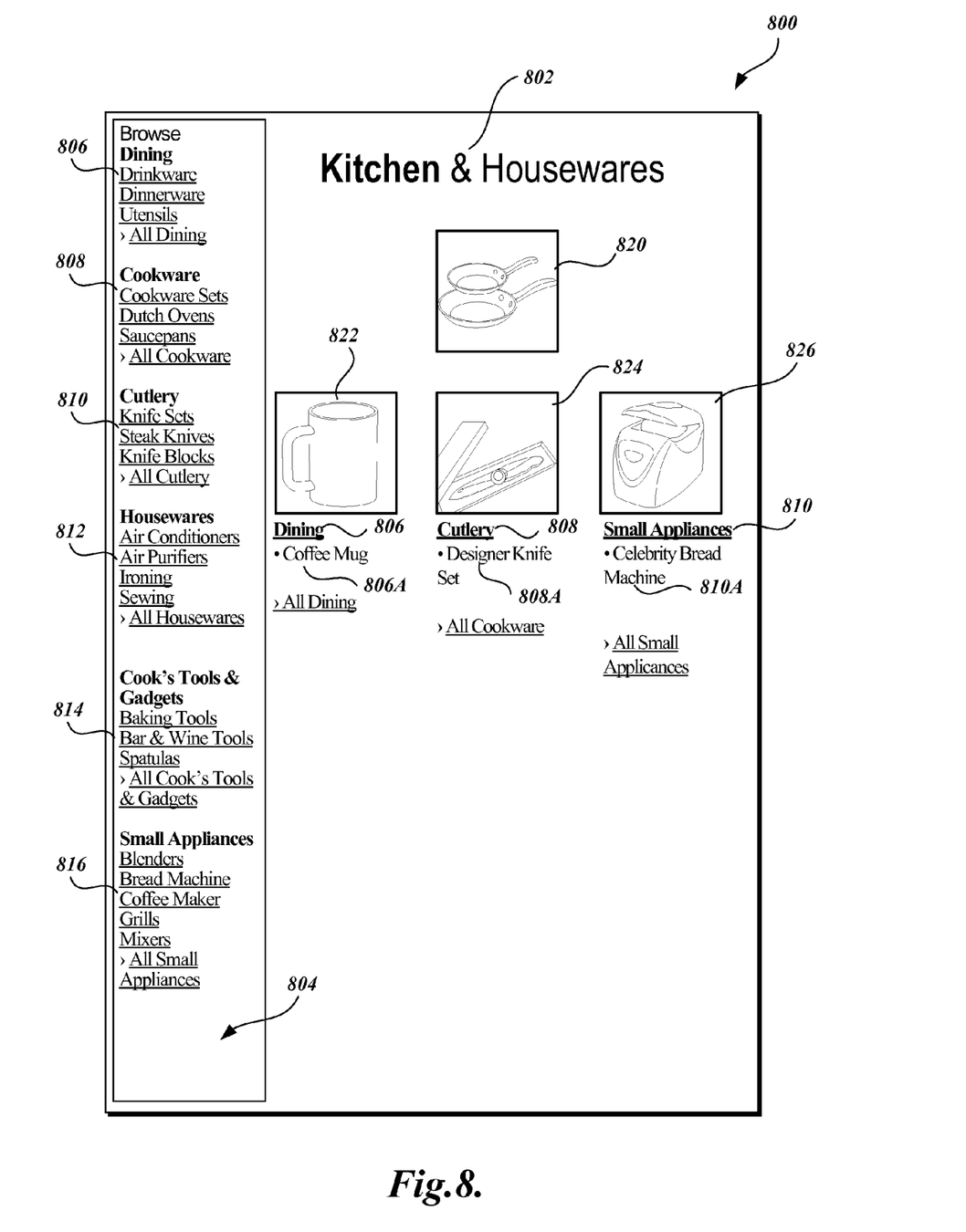
FIG. 8 is a flow diagram for a routine that transforms a relevance score based on the price of the product.

Referring now to FIGS. 1 and 3, the retail server 110 receives the ranked catalog items from the relevance server 200 and determines a display configuration for the node. Continuing with the above example, the category "Kitchen & Housewares" is represented by its own browse node. If the ranked list of relevance scores 330 shows that the coffee mug featuring a popular television personality is the highest ranked item within the "Kitchen & Housewares" browse node, the retail server will configure the display for that node such that the coffee mug is prominently displayed on the Web page representative of the "Kitchen & Housewares" browse node. This is illustrated in FIG. 8, which will be discussed in greater detail below.

Figure 2:
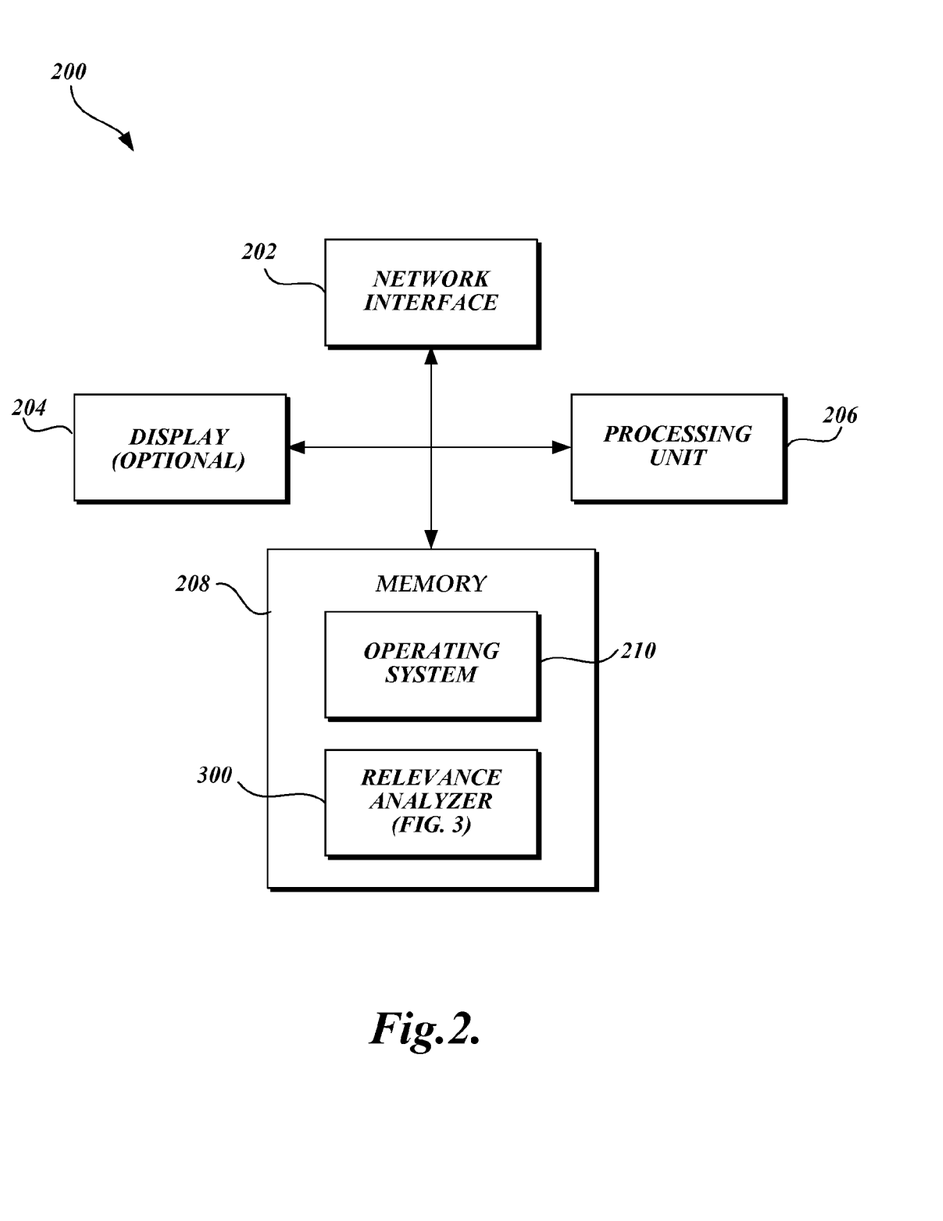
FIG. 2 is a block diagram of a sample environment for a relevance server in accordance with an embodiment of the present invention.

To provide a context for describing embodiments of the present invention, FIG. 2 illustrates a functional block diagram of the relevance server 200 depicted in FIG. 1. As described in more detail below, the relevance server 200 is configured to use a relevance analyzer 300 to determine the display configuration of catalog items within browse nodes. For example, the relevance server 200 receives relevance data 306 pertaining to the coffee mug and utilizes the relevance analyzer 300 to determine exactly where to position the mug amongst other items on its corresponding Web page.

In one embodiment, the relevance analyzer 300 is a computer software component stored along with an operating system component 210 in memory 208 of the relevance server 200. In other embodiments, the relevance analyzer 300 may be implemented as part of the operating system component 210 or may be implemented, in whole or in part, as the relevance server's firmware or hardware.

The relevance server 200 also includes a variety of computing elements including a network interface 202, an optional display 204, a processing unit 206, and a memory 208. The network interface 202 enables the relevance server 200 to transmit the ranked list of relevance scores 330 to the retail server 110.

The processing unit 206 is configured to act in accordance with computer program instructions stored in a memory, such as the memory 208. As noted above, the processing unit 206 may execute computer program instructions, such as those embodied in the relevance analyzer 300, that create the ranked list of relevance scores 330. The relevance analyzer 300 will be described in more detail below. In addition, the memory 208 stores an operating system 210 for controlling the general operation of the relevance server 200. The operating system 210 may be a general purpose operating system such as a MICROSOFT operating system, UNIX operating system, or LINUX operating system.

FIG. 3 is a block diagram depicting a process using relevance data 310 related to an item to configure the display of a Web page representative of a browse node in accordance with one or more embodiments of the present invention. The relevance analyzer 300 receives relevance data 310 for an item and produces a ranked list of relevance scores 330 for the item for each browse node with which the item is associated. The ranked list of relevance scores 330 is then transmitted to the retail server 106 which utilizes the relevance scores 330 to configure the display of a Web page representation of a browse node. In one embodiment, the relevance data contains a variety of information including browse data 310A, popularity data 310B, newness data 310C, category fit data 310D, and price range data 310E.

Browse data 310A includes information regarding a user's historical browsing activities within a particular browse node. Browse data 310A is gathered from clickstream data. As detailed above, this includes, but is not limited to, the amount of times an item was "clicked" or selected, the number of times the item was added to a cart for purchase, the total number of times the item was purchased, etc.

Popularity data 310B includes but is not limited to special characteristics of a product such as whether the item is part of a market trend, based on a popular character, based on a popular theme, the sales rank of the item, etc. For instance, if the coffee mug of the aforementioned example is based on a popular television character, such information will be included in the popularity data 310B. Similarly, sales rank information may be reflected in the popularity data 310B. One skilled in the art will recognize that a catalog item may possess one or a combination of the factors described above and that such information can be used to rank items with respect to one another.

Newness data 310C includes information regarding whether the item is new to the catalog, the browse node, or if it is a previously existing item. For instance, if a new item is added to the "Kitchen & Housewares" browse node, such as a bread machine endorsed by a celebrity, it will be reflected within the newness data 310C.

Category fit data 310D includes, but is not limited to, all the categories within various browse nodes under which an item can be classified. For instance, the coffee mug may be categorized within "Kitchen & Housewares," "Dining," "Drinkware," "Coffee mugs," etc. Category fit data 310D will include data regarding every category under which an item can be classified. One skilled in the art will recognize that within a catalog, items may be classified into a number of different categories and levels.

Price range data 310E includes information regarding the price of an item compared to other items within its same category. For instance, if the coffee mug has a price higher than other coffee mugs, that information will be a part of the price range data 310E. One skilled in the art will recognize that there is a wide variety of information that could be contained within relevance data 310. Thus, the ones listed in this embodiment, namely clickstream data 310A, popularity data 310B, newness data 310C, category fit data 310D, and price range data 310E, are for purposes of example only and should not be construed as limiting.

As noted above, the relevance analyzer 300 uses relevance data 310 to construct a ranked list of relevance scores 330 related to an item. For instance, the relevance analyzer 300 will gather all of the relevance data 310 concerning a celebrity endorsed bread machine that has been categorized under a number of categories. The relevance data 310 shows that the celebrity bread machine has been purchased one thousand times by users from within the "Celebrity Merchandise" browse node. Relevance data also shows that the celebrity bread machine is the number one seller within the "Celebrity Merchandise" browse node. Relevance data 310 shows that the same bread machine is accessible from the browse node for "Kitchen & Housewares." However, under "Kitchen & Housewares," the bread machine has only been purchased five hundred times and is ranked second in total sales. These differences in sales rank and times purchased per browse node affect the items relevance scores for each category and its corresponding browse node. As a result, the bread machine may be prominently featured in a Web page representative of the related "Celebrity Merchandise" browse node, but may not be as prominently featured on a Web page for "Kitchen & Housewares" browse node.

The relevance analyzer 300 receives relevance data 310 similar to that used in the given examples and uses that data to determine a ranking for each category with which an item is associated. Once completed, the relevance analyzer 300 produces a ranked list of relevance scores 330 for each category associated with each item and transmits that data to the retail server 106. The retail server 106 uses the ranked lists to determine the display configuration of items for each browse node. For instance, in the examples used above, the celebrity endorsed bread machine is the third ranked item within "Kitchen & Housewares," whereas the coffee mug featuring a popular television personality is the highest seller within the "Kitchen & Housewares" browse node. The relevance analyzer will receive this and other relevance data 310 and determine the position of both items within a Web page for the "Kitchen & Housewares" browse node 802. For example, FIG. 8 illustrates a Web page for the "Kitchen & Housewares" browse node with the highest scoring item, the coffee mug, being prominently displayed.

Figure 4:
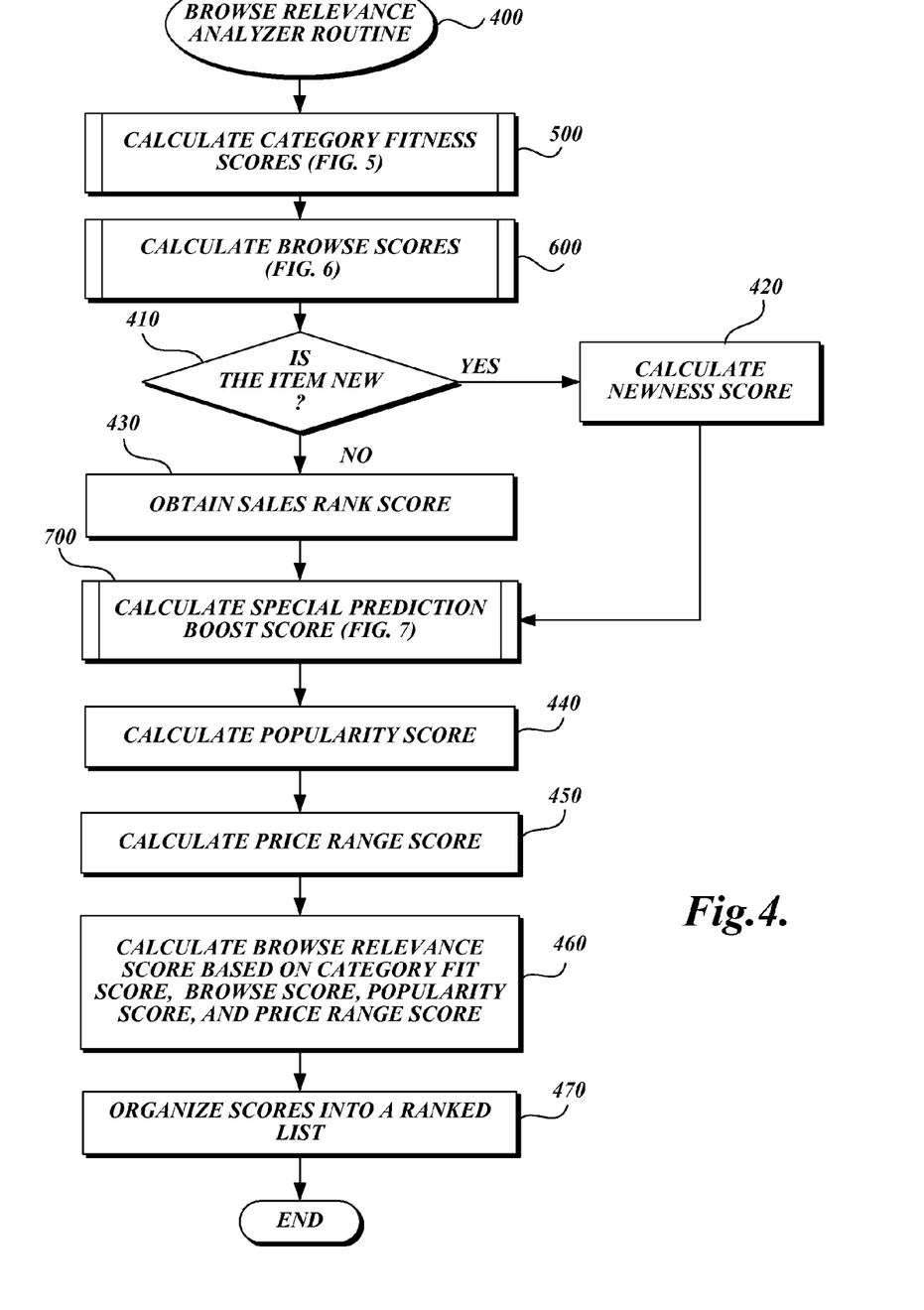
FIG. 4 is a flow diagram of a sample browse relevance routine in accordance with an embodiment of the present invention.

FIG. 4 is a flow diagram illustrative of a sample browse relevance analyzer routine 400 implemented by the relevance analyzer 300 to create a ranked list of relevance scores 330 in accordance with embodiments of the present invention. In one embodiment, the routine 400 takes items within a catalog of items and scores the items for each category within a browse node in which the item is classified. For instance, the celebrity bread machine may be classified into "Celebrity Merchandise," "Kitchen & Housewares," "Small Appliances," etc. The routine 400 will give the celebrity endorsed bread machine relevance scores for each of those categories and ultimately, their corresponding browse nodes. The ranked list of relevance scores 330 is then used to determine the display configuration of items on Web pages representative of those categories.

More specifically, the routine 400 creates relevance scores per browse node for each item within a catalog of items, organizes the relevance scores into ranked lists for each item per browse node, and then uses the ranked list of scores to determine the position of the items on a Web page that pertains to a browse node representing those categories. For instance, the coffee mug featuring the likeness of a television personality has a wealth of associated information. This information includes, but is not limited to, how many categories it may be classified under, how many times it has been clicked on by users, how many times it has been selected by users for purchase, its sales rank, how well it is priced based on other coffee mugs, etc. The routine 400 gathers all the relevance data 306 and uses it to determine where to display the item within the Web pages for the categories it is associated with.

In one embodiment, the browse relevance analyzer routine 400 begins a subroutine 500, where category fitness scores for an item are calculated. Category fitness scores are based on determinations of how well an item matches up to the category with which it is associated. Subroutine 500 and category fitness scores will be discussed in more detail with regard to FIG. 5. After the category fitness scores are returned at subroutine block 500, at subroutine block 600 the browse scores for the item are calculated. Browse scores are based on clickstream data including, but not limited to, how many times an item has been purchased. Subroutine 600 and browse scores will be discussed in more detail with regard to FIG. 6.

At decision block 410, the routine 400 determines if the item is new. If it is determined that the item is new, at block 420 a newness score is calculated. In one embodiment, the newness score is calculated by awarding a new item a predetermined score based on where an electronic retailer would like it to initially be located within the Web page representative of the browse node. One skilled in the art will recognize that at any point in time there will be a number of pre-existing items within a catalog of items. When a new item is introduced, the routine 400 will provide a means of determining where it will be displayed within a Web page. For instance, assume there are ten pre-existing items in the "Kitchen & Housewares" browse node, and a new designer knife set is added to the catalog of items. The newness score may be populated to immediately place the designer knife set in a particular spot. For example, to place the designer knife set in a position equal to an item ranked second in sales within the "Kitchen & Housewares" browse node, the designer knife set would be given a newness score 420 equal to that of the number two ranked item.

In another embodiment, the newness score may be used to score an item relative to the scores of other items in the browse node. For example, assume again that there are ten pre-existing items in the "Kitchen & Housewares" browse node, and a new designer knife set is added to the catalog of items. However, browse relevance data shows that the range of scores for the items in the "Kitchen & Housewares" browse node is between a minimum of 10 and a maximum of 100. Thus, if the electronic retailer desires for a new item to be placed in the middle of the pre-existing items, it would be meaningless for the designer knife set to receive a score of 5 as it would automatically place the designer knife set below the other items in the browse node. The electronic retailer can use the newness score to give the designer knife set a score relative to the other items in the browse node. This ensures the item is placed in a position in which the electronic retailer desires. One skilled in the art will appreciate that relative scoring based on the scores of other items can be applied to any of the scores determined by the routine 400, routine 500 or the routine 600. Any time a new item is introduced to the catalog of items, the newness score 420 may be used to place the new item in a particular position on a Web page.

In another embodiment, the relative ranking of an item can be based on percentage values. For example, an item could be placed in a position where 25% of the other items in the category are ranked highest. Returning to the given example, the designer knife set could be placed in a position where no more than 25% of pre-existing items will be ranked higher than the designer knife set. One skilled in the art will appreciate that there are many ways to determine and implement a relative ranking.

If it is determined at decision block 410 that the item is not new, at block 430 the sales rank score is obtained. The sales rank for an item may be used as one of the item scores to compute a relevance score. At subroutine block 700, a special prediction boost score for the item may be obtained and used to determine if the item should receive an additional boost in scoring based on outside factors. For example, an item that is part of a popular theme involving a famous television chef may receive a boost in scoring to ensure it is placed in a high traffic area and attracts the attention of users. The special prediction boost will be discussed in more detail below with respect to FIG. 7.

At block 440, the routine 400 will calculate a popularity score for an item. The popularity score is given to an item based on determinations of the item's sales rank, newness, or any outside factors such as being a part of popular theme, based on a popular character, etc., that could result in it being a popular item. If the item is a new item, the popularity score is determined using the newness score and a special prediction boost score. If the item is a pre-existing item, the popularity score is determined based on the sales rank score and the special prediction boost score. The popularity score provides another means of ensuring that a popular or high selling item is prominently displayed within a Web page for items within a particular browse node.

The routine 400 then moves to block 450 and calculates a price range score for the item based on its price range. The price range score may be used as a mathematical weight to approximate how its price compares with other similar items. For instance, if a coffee mug is very expensive compared to other coffee mugs, the item can be given a low mathematical weight to pull the overall browse relevance score down. To the contrary, if an item is less expensive than other coffee mugs, the item may be given a high mathematical weight to move its score higher. For example, if a retailer is focused on delivering low cost items to its customers, it can use the price range score to ensure that low cost items are always displayed prominently within the Web page.

At block 460, the routine 400 determines browse relevance scores for the item based on each browse node into which it can be categorized. In one embodiment, for each browse node into which an item can be categorized, a sum of the category fitness score, browse score, and popularity score is calculated. The sum multiplied by the price range score is calculated at block 440. At block 470, all possible scores for the item per browse node and corresponding category will be organized into a ranked list. In one embodiment, the browse relevance score is a numerical value. Accordingly, the scores are ranked in one embodiment from highest to lowest in numerical value.

In another embodiment, the browse relevance score is a percentage. Therefore, the scores are ranked in one embodiment from highest to lowest by percentage value. One skilled in the art will recognize that there are a number of ways to mathematically determine and/or to rank browse relevance scores. Thus, the examples discussed herein are provided for purposes of example only and should not be construed as limiting.

Figure 5:
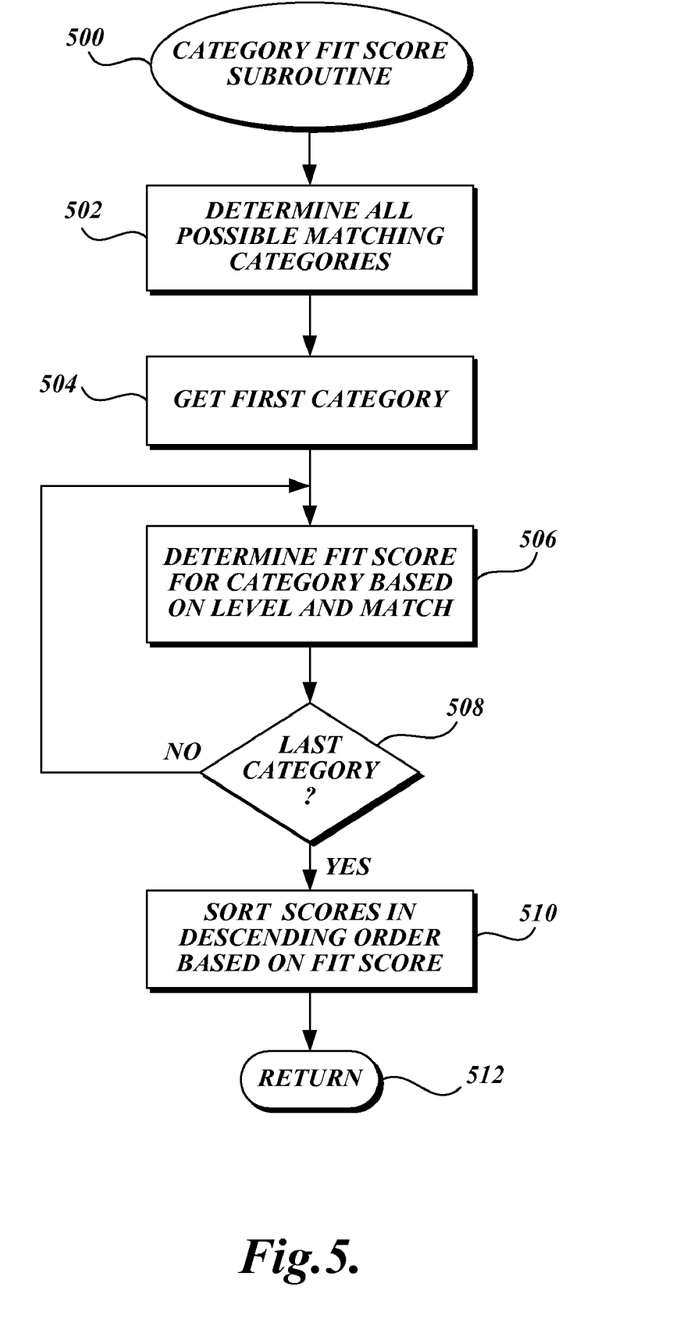
FIG. 5 is a flow diagram of a category fit score routine in accordance with an embodiment of the present invention.

FIG. 5 is a flow diagram of subroutine 500 depicting the process of calculating a category fit score, which assigns scores to items based on the categories into which the item can be classified. More specifically, the category fit score is based on the category match and the level within the browse tree category in which the match occurs. As mentioned above, an item can be associated with one or more categories. Thus, an item may appear under multiple browse nodes, each browse node representing a different category. For example, a coffee mug featuring a popular television personality can be categorized as both celebrity merchandise and housewares. Celebrity merchandise has its own corresponding browse node "Celebrity Merchandise." Similarly, housewares has its own corresponding browse node "Kitchen & Housewares." As a result, the coffee mug featuring the popular television personality will appear on a Web page representing the "Celebrity Merchandise" browse node and a Web page representing the "Kitchen & Housewares" browse node. Thus, a determination of each category an item can be categorized within must be made to determine browse nodes the items should appear within.

An item will receive a score for each category into which it falls. The stronger the match between the item and the category it falls into, the higher the category score may be. For instance, a bread machine will receive a higher category score in a category for small kitchen appliances than it would for general merchandise based on the stronger match between bread machines and kitchen appliances. At block 502, the subroutine 500 determines all possible matching categories for a particular item. The subroutine 500 then proceeds to block 504 where the first category into which an item can be classified is obtained.

At block 506, a category fit score is determined based on the browse node level and category match. Again, each category of items within the browse tree occupies a level. For instance, at level one the coffee mug would be categorized as merchandise. At level two the coffee mug is categorized as "Celebrity Merchandise" and "Kitchen & Housewares." At level three, the coffee mug is categorized as "Dining," etc. As stated above, the stronger the match between a category and an item, the higher the score. Thus, an item related specifically to dining would receive a higher category fit score under the "Dining" browse node than under the "Kitchen & Housewares" browse node. In one embodiment, the matching process is a manual process performed by one who is skilled in the art. In addition, there are a number of ways that an item such as a coffee mug can be classified. Thus, the classifications described herein are for purposes of example only and should not be construed as limiting.

At decision block 508, a determination is made as to whether the final category match for the item has been made. In one embodiment, the final category match is a manual determination. If it is determined that additional category matches are to be made, subroutine 500 returns to block 506 and determines a fit score for each additional category. However, if it is determined that there are no more categories, subroutine 500 proceeds to block 510 where all possible category fit scores are sorted. One skilled in the art will recognize that the items may be sorted in ascending order, descending order or any other order. Once all category fit scores are sort in block 510, the category fit score routine 500 returns in block 512 to the browse relevance analyzer routine 400.

Figure 6:
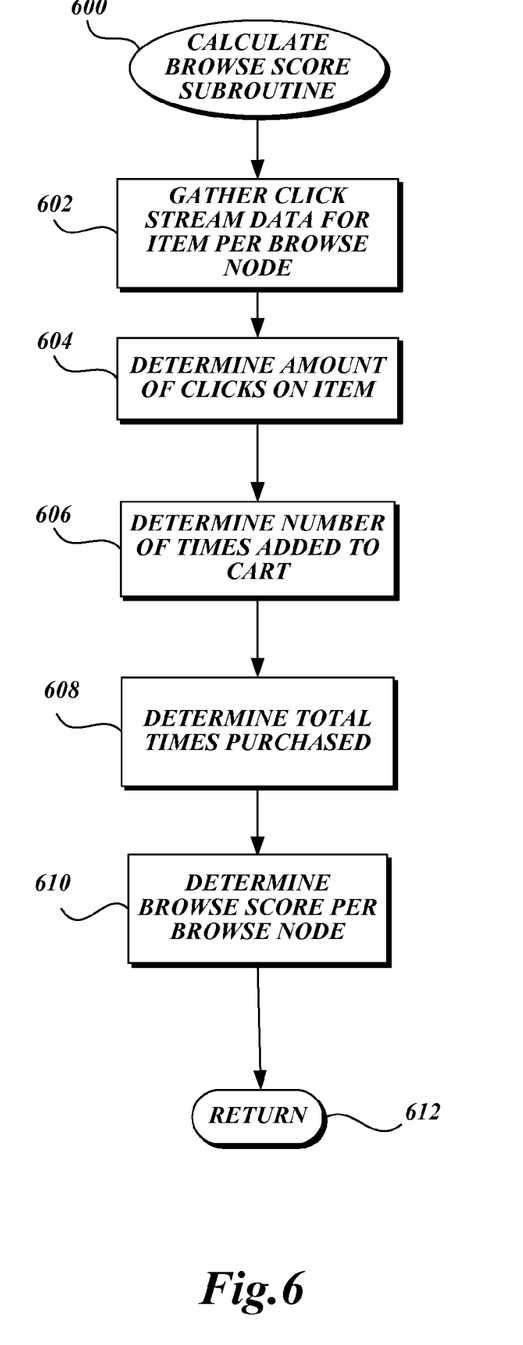
FIG. 6 is a flow diagram of a routine that gathers browse relevance data in accordance with an embodiment of the present invention.

FIG. 6 is a flow diagram illustrating a subroutine for calculating a browse score 600 in accordance with an embodiment of the present invention. A browse score is a score for an item based on user browsing habits regarding the particular item. At block 602, clickstream data for the item is gathered for each associated browse node. As mentioned above, clickstream data identifies a path users take while browsing a Web site. Each selection a user makes while browsing a Web page represents a click in the stream. The browse score focuses on a user's actions within a particular browse node. At block 604, the total amount of clicks per item is determined.

At block 606, the number of times the item was added to a cart for purchase is determined. This information reflects when a user selects an item for purchase regardless of whether the purchase was actually made. The subroutine 600 then moves to block 608 where the total times an item was purchased is determined. At block 610, the subroutine 600 uses the values per browse node determined in block 604, block 606, and block 608 to mathematically determine a browse score for the item for each browse node. For example, the browse score may be determined by adding together the values determined in block 604, block 606, and block 608. For example, if while within the "Kitchen & Housewares" browse node the coffee mug has been selected or clicked X number of times, selected for purchase Y number of times, and actually purchased Z number of times, all these values will be used to produce a browse score for the item under the "Kitchen & Housewares" browse node. To the contrary, if the coffee mug has been selected or clicked A number of times, selected for purchase B number of times, and actually purchased C number of times under the "Celebrity Merchandise" browse node, those values will be used together to produce a score for the item under the "Celebrity Merchandise" browse node. Once the browse score per node has been determined in block 610, the browse score subroutine 600 returns in block 612 to the browse relevance analyzer routine 400.

Figure 7:
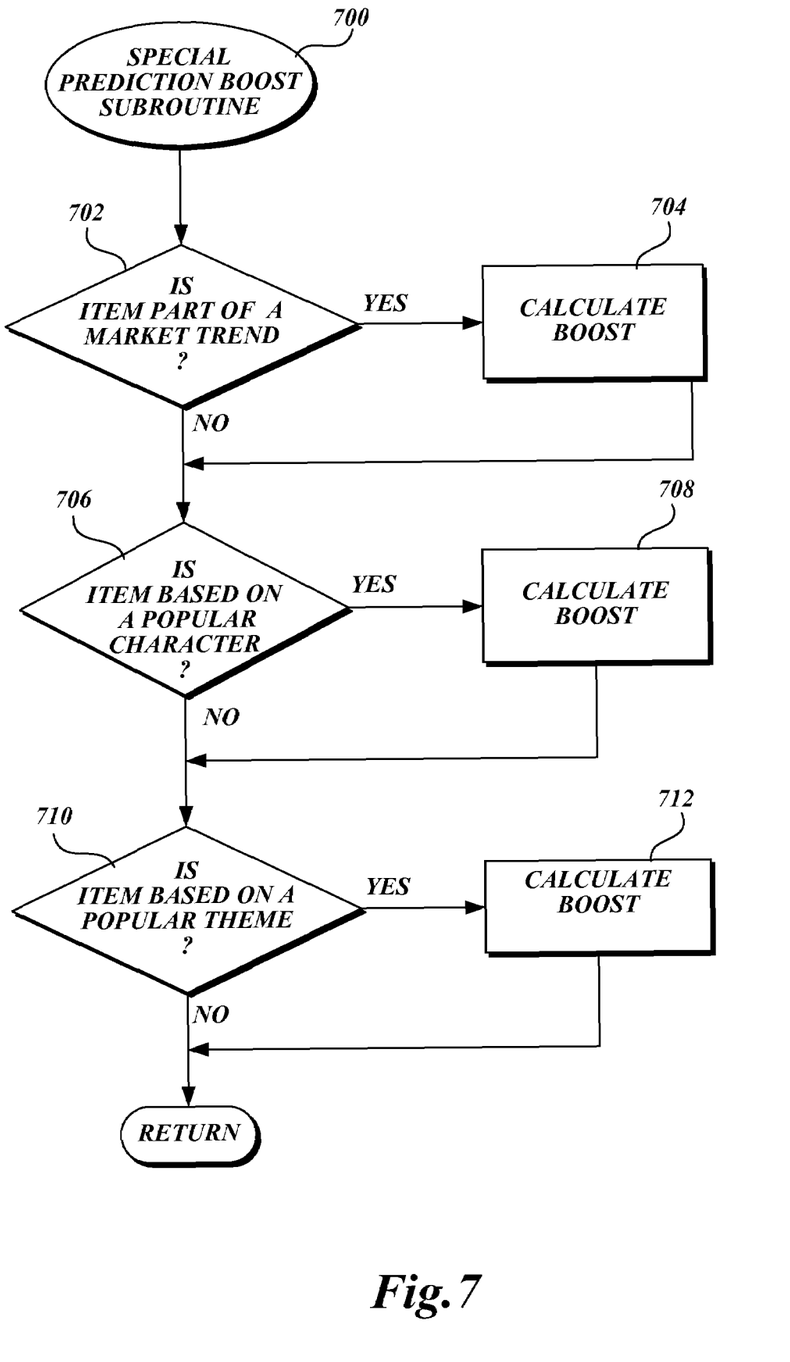
FIG. 7 is a flow diagram of a routine that determines whether an item receives a special boost based on a number of factors in accordance with an embodiment of the present invention.

FIG. 7 is a flow diagram illustrating the special prediction boost subroutine 700 which provides a boost in scoring to an item based on additional factors including, but not limited to, market trends, popular characters, and popular themes. At decision block 702, the subroutine 700 determines if the item is part of a market trend. For example, if there is currently a trend for bread machines, any items that meet this criteria will receive a boost. If it is part of a market trend, then the subroutine 700 proceeds to block 704 and calculates a boost for the item and continues to decision block 706. If it is determined that the item is not part of a market trend, the subroutine 700 proceeds to decision block 706.

At block 706, a determination is made as to whether the item is based on a popular character. For instance, the bread machine may feature the likeness of a popular character on its side. In another example, it may be endorsed by an actor who portrays a popular television character. If the item is based on a popular character, then the subroutine 700 proceeds to block 708 and a boost for the item is calculated. If it is determined that item is not based on a popular character, the subroutine 700 moves to decision block 710.

At block 710, a determination is made as to whether the item is based on a popular theme. If the item is based on a popular theme, it will receive a boost at block 712. For example, if celebrity endorsed bread machines are currently popular items, items that meet this criteria will receive a boost. In one embodiment, the determination of whether an item will be given a boost is a manual determination. Alternatively, automatic predictors may determine when to boost items. For example, if a particular celebrity promotes items and a new movie is released starring that celebrity, it may be automatically determined to add a boost to items endorsed by that celebrity. In another embodiment, the popularity score includes user feedback with regard to an item. For example, if user feedback concerning an item has been positive, that item would receive a boost. Once the special prediction boost has been processed, the special prediction boost routine 700 returns in a block 712 to the browse relevance analyzer routine 400.

With reference now to FIG. 8, a Web Page 800 corresponding to the display of items within the browse node "Kitchen & Housewares" 802 will be described. The Web Page 800 is an example of Web page whose display configuration has been arranged according to embodiments of the present invention as described with respect to FIG. 4. The illustrative Web page 800 can include a browse menu 804 displaying a number of different item categories. For example, the browse menu can include categories corresponding to "Dining" 806, "Cookware" 808, "Cutlery" 810, "Housewares" 812, "Cook's Tools & Gadgets" 814, and "Small Appliances" 816. Each item category may further include subcategories that allow a user to narrow his or her search to more specific categories. For example, "Dining" 806 includes sub-nodes representing subcategories for "Drinkware," "Dinnerware," and "Utensils." By clicking on one of the sub-nodes, the user is able to narrow his or her search to the more specific type of subcategory.

In addition to the browse menu 804, the illustrative interface 800 may include illustrations that correspond to the different type of categories and to specific items within the categories. Using the ranked list of relevance scores 330, specific items within browse nodes may be displayed prominently to attract the attention of users. In the illustrated Web page 800, a "Coffee Mug" 806A, "Designer Knife Set" 808A, and "Celebrity Bread Machine" 810A have been ranked highest in the ranked list of relevance scores 330 for different categories. As a result of their high rankings, the "Coffee Mug" 806A, "Designer Knife Set" 808A, and "Celebrity Bread Machine" 810A are featured exclusively on the illustrated Web page 800. In addition, the illustrative Web page 800 can include illustrations that correspond to the top ranked items. For example, the "Coffee Mug" 806A can correspond to illustration 822. Likewise, the "Designer Knife Set" 808A can correspond to illustration 824. Further, the "Celebrity Bread Machine" 810A can correspond to illustration 826. The "Kitchen & Housewares" category can correspond to the illustration 820. In addition, in the illustrative Web page 800 the categories can be modified from listing sub-categories in the browse menu 804 to listing only the ranked items. For instance, "Dining" 806 will now reflect only the ranked item "Coffee Mug" 806A or a set of top ranked items. Likewise, "Cutlery" 808 will now reflect only the ranked item "Designer Knife Set" 808A or a set of top ranked items. Further, "Small Appliances" will only reflect the ranked item "Celebrity Bread Machine" 810A or a set of top ranked items. One skilled in the art will recognize that any number of items may be displayed within a Web page. Additionally, using the relevance data, any display configuration may be developed such that particular items are prominently displayed to users viewing the Web sites. Thus, electronic retailers are capable of strategically locating popular items at particular locations (e.g., high traffic areas).

Prior to this invention, the "Coffee Mug" 806A, "Designer Knife Set" 808A, and "Celebrity Bread Machine" 810A would likely have been lower in the browse tree. Thus, locating them would have required significant additional user navigation. For example, in the browse menu 804, locating the "Coffee Mug" 806A would require the user to select the category "Dining" 806, followed by several sub-categories and then potentially scroll through a Web page with several items displayed before locating the coffee mug. As described above, embodiments of the present invention provide the ability to configure a display such that desired/appropriate items are located in easily identifiable areas.

While sample embodiments have been illustrated and described, it will be appreciated that various changes can be made therein without departing from the spirit and scope of this disclosure. It will be appreciated that embodiments of the present invention may be used in other environments outside of network retail. In one embodiment, books within certain categories in a library could be scored according to how many times they been checked out. The embodiments described herein could be used to configure a library catalog such that it prominently displays books that have been checked out the most within certain categories. The scope of the present invention should thus be determined, not from the specific examples described herein, but from the following claims and equivalents thereto.

The embodiments of the invention in which an exclusive property or privilege is claimed are defined as follows:

1. A system for determining a display configuration based on a relevance of items within a category, the system comprising:
    a computing device comprising a memory, the memory storing instructions that, when executed, cause the computing device to execute:
    a catalog component configured to identify a plurality of items for which a display configuration is to be generated;
    a relevance component configured to identify browse relevance data for each of the plurality of items, the browse relevance data comprising available data from browse data relating to browse habits of a plurality of users with respect to each item, popularity data relating to each item, newness data relating to an amount of time that each item has been available, category fit data indicating a determined measure of relatedness between each item and the category, a prediction boost score for each item that is part of a market trend or based on a popular theme, and price range data relating to the price of each item with respect to the other items in the category;
    a relevance analyzer component configured to create an ordered list of browse relevance scores for each of the plurality of items within the category based at least in part on the determined browse relevance score for each item, the browse relevance score for each of the plurality of items with respect to the category being calculated by:
    summing at least a category fit score calculated at least in part using the category fit data, a browse score calculated at least in part using the browse data, and a popularity score calculated at least in part using the popularity data, the prediction boost score, and the newness data; and
    multiplying a result of the summing for each item by a price range score for the item; and
    a display component configured to arrange a display of items based on the ordered list of browse relevance scores.

2. A computer-implemented method for generating a display configuration, the method comprising:
    under control of one or more computing devices configured with executable instructions,
    identifying a plurality of items for which a display configuration is operable to be generated, each of the plurality of items being associated with at least one category;
    identifying browse relevance data for each of the plurality of items with respect to the at least one category for each item;
    computing a browse relevance score for each of the plurality of items with respect to the at least one category from the browse relevance data, each item capable of having a different browse relevance score for the at least one category associated with that item, each browse relevance score being calculated by summing a category fit score, a browse score, and a popularity score and multiplying a result of the summing by a price range score for the item, the popularity score for each item capable of being adjusted using at least one of newness data relating to an amount of time that the item has been available and a prediction boost score for each item that is part of a market trend or based on a popular theme;
    for a specified category for which the display configuration is to be generated, identifying items from the plurality of items that correspond to the specified category based on their respective browse relevance scores; and
    generating the display configuration to include the identified items in an arrangement based at least in part upon the respective browse relevance scores for the specified categories.

3. The computer-implemented method of claim 2, wherein at least one category corresponds to a browse node.

4. The computer-implemented method of claim 3, wherein each respective browse relevance score is a percentage.

5. The computer-implemented method of claim 2, wherein the browse relevance data includes browse data.

6. The computer-implemented method of claim 5, wherein the browse relevance score is a numerical value.

7. The computer-implemented method of claim 2, wherein the browse relevance data includes popularity data.

8. The computer-implemented method of claim 7, wherein the popularity data includes category fit data.

9. The computer-implemented method of claim 7, wherein the popularity data includes price range data.

10. The computer-implemented method of claim 2, wherein the browse relevance data includes newness data.

11. The computer-implemented method of claim 10, wherein the newness data indicates whether an item is new.

12. The computer-implemented method of claim 2, wherein said browse relevance data includes category fit data.

13. The computer-implemented method of claim 12, wherein said category fit data includes an indication of users.

14. The computer-implemented method of claim 2, wherein said browse relevance data includes price range data.

15. The computer-implemented method of claim 14, wherein said price range data includes the item.

16. The computer-implemented method of claim 14, wherein said price range data includes the price of all items within a category.

17. The computer-implemented method of claim 2, wherein the popularity score is determined based at least in part upon a sales rank score.

18. The computer-implemented method of claim 2, wherein said browse relevance score is used to rank items within a browse node.

19. The computer-implemented method of claim 18, wherein said browse relevance score is used to generate a ranked list of items.

20. The computer-implemented method of claim 2, wherein the popularity score is determined based at least in part upon a prediction boost score.

21. The computer-implemented method of claim 2, wherein the popularity score is determined based at least in part upon a sales rank score.

22. The computer-implemented method of claim 2, wherein the browse relevance score is further calculated using at least one of a newness score, sales rank score, and prediction boost score.

23. The computer-implemented method of claim 2, wherein said browse relevance scores are organized into a ranked list.

24. The computer-implemented method of claim 23, wherein generating the display configuration causes items to be displayed in accordance with the ranked list.

25. The computer-implemented method of claim 24, wherein the ranked list of browse relevance scores is used to generate the display configuration.

26. A computer-readable storage medium having computer-executable components for determining relevance of items within a category, the computer-executable components comprising:
   a category fit score component for determining a category fit score for each of a plurality of items and for each category to which each item belongs;
   a browse score component for determining a browse score for each of the plurality of items based on historical activities of users with respect to the items and each category to which the items belong;
   a popularity score component for determining a popularity score for each of the plurality of items based on a popularity of the item within at least one of the categories to which the item belongs;
   a prediction boost score component for determining a prediction boost score to be applied to the popularity score for at least one of the plurality of items when the at least one item is part of a market trend or based on a popular theme;
   a browse relevance score component for determining a browse relevance score for each item for each category to which that item belongs, the browse relevance score for each item with respect to each category being calculated by summing at least the category fit score, the browse score, and the popularity score and multiplying a result of the summing for each item by a price range score for the item; and
   a display component configured to arrange a display of items based on the determined browse relevance scores for items in at least one specified category.

27. The computer-readable storage medium of claim 26, further comprising a newness score component for determining a newness score for each of the plurality of items.

28. The computer-readable storage medium of claim 26, further comprising a price range score component for determining a price range score for at least one of the plurality of items based on a popular character.

29. The computer-readable storage medium of claim 26, wherein an item may be associated with multiple categories.

30. The computer-readable storage medium of claim 26, wherein an item may be associated with multiple browse nodes.

31. The computer-readable storage medium of claim 26, wherein a Web page to be displayed is configured to prominently display items having a highest browse relevance score.

32. The computer-readable storage medium of claim 26, wherein the browse relevance score is a percentage.

33. The computer-readable storage medium of claim 26, wherein the browse relevance scores are organized into a ranked list.

34. A computer-implemented method for determining a browse relevance score for an item classified in multiple categories, the method comprising:
   a computing device comprising a memory, the memory storing instructions that, when executed, cause the computing device to:
   identify each category with which the item is classified; and
   for each identified category:
      determine a category fit score for the item;
      determine a browse score for the item based on the historical activities of users within a browse node that corresponds to the category;
      determine a prediction boost score that provides an additional score if the item is part of a market trend or the item is based on a popular theme;
      determine a popularity score for the item based on the popularity of the item and based at least in part upon the prediction boost score; and
      determine a browse relevance score for each item with respect to the category by summing at least the category fit score, the browse score, and the popularity score, and multiplying a result of the summing for each item by a price range score for the item,
   wherein the browse relevance score for each identified category is used to select an arrangement of the item in a display generated for any of the identified categories.

35. The computer-implemented method of claim 34, wherein the browse relevance score is used to determine the display of items within an electronic retail environment.

36. The computer-implemented method of claim 34, wherein the popularity score includes a newness score that provides an additional score if the item is new.

37. The computer-implemented method of claim 34, wherein the popularity score includes a special prediction boost score that provides an additional score based on a popular character.

38. The computer-implemented method of claim 34, wherein the browse relevance score includes a price range score that provides an additional score based on the price of the item.

39. The computer-implemented method of claim 34, wherein the item may be associated with multiple browse nodes.

40. The computer-implemented method of claim 34, wherein the browse relevance score is a numerical value.

41. The computer-implemented method of claim 34, wherein the browse relevance score is a percentage.

42. The computer-implemented method of claim 34, wherein the browse relevance scores are organized into a ranked list.

43. A system for generating a display configuration for items associated with a catalog of items, the system comprising:
   a computing device comprising a memory, the memory storing instructions that, when executed, cause the computing device to execute:
      a catalog component configured to identify items corresponding to at least one category for which a display configuration is to be generated;
      a scoring component configured to determine at least one browse relevance score for each identified item, the at least one browse relevance score for each item being generated with respect to each category by:

summing at least a category fit score calculated at least in part using category fit data indicating a determined measure of relatedness between each item and the category, a browse score calculated at least in part using the browse data relating to browse habits of a plurality of users with respect to each item, and a popularity score calculated at least in part using popularity data relating to each item, a prediction boost score, and newness data, wherein the prediction boost score represents a current popularity or market trend for each item and the newness data represents an amount of time that the item has been available; and multiplying a result of the summing for each item and each category by a price range score for the item; and a display component configured to generate a display configuration of items arranged based at least in part on the determined scores.

44. The system of claim 43, wherein the items are displayed on a Web page.

* * * * *